US005681029A

United States Patent [19]

Reesor et al.

[11] Patent Number: 5,681,029

[45] Date of Patent: Oct. 28, 1997

[54] MODULAR JACK

[75] Inventors: David Warren Reesor; David Roy Joseph Reesor, both of Calgary, Canada

[73] Assignee: Hydra-Tech International Corporation, Calgary, Canada

[21] Appl. No.: 584,291

[22] Filed: Jan. 11, 1996

[51] Int. Cl.[6] .......... B60P 1/16

[52] U.S. Cl. .......... 254/2 R; 254/93 H; 254/1; 254/134

[58] Field of Search .......... 254/2 R, 8 R, 254/1, DIG. 1, 134, 2 B, 8 B, 93 H, 93 R, 133 R, DIG. 3; 269/17

[56] References Cited

U.S. PATENT DOCUMENTS

| | | | |
|---|---|---|---|
| 2,361,197 | 10/1944 | Hallinan | 254/93 H |
| 4,434,968 | 3/1984 | Smith | 254/1 |
| 4,534,543 | 8/1985 | Gray | 254/1 |
| 4,865,293 | 9/1989 | Ishi et al. | 254/DIG. 1 |
| 5,121,900 | 6/1992 | McDonald | 254/2 R |
| 5,433,127 | 7/1995 | Messier | 254/DIG. 1 |

*Primary Examiner*—Timothy V. Eley
*Assistant Examiner*—Lee Wilson
*Attorney, Agent, or Firm*—George A. Seaby

[57] ABSTRACT

Portable, heavy duty jacks used in the railway, mining and construction industries are expensive units including a motor, a pump, a working fluid reservoir and a hydraulic cylinder, all mounted on a wheeled carriage. The jacks are moved to a use location and often left in one position for a lengthy period of time. Thus, it is often necessary to stock a large number of expensive units. A simple solution to the problem involves a single power module including a carriage, a motor, a pump and a fluid reservoir, and separate lift modules including a hydraulic cylinder. A lift module is releasably connected to the power module for moving the module to a use location, where the hydraulic cylinder is actuated to raise a load. The two modules are then disconnected, another lift module is attached to the power module, and the resulting unit is moved to another use location.

13 Claims, 8 Drawing Sheets

MODULAR JACK

BACKGROUND OF THE INVENTION

1. Field of the Invention

This invention relates to a jack and in particular to a modular, heavy duty jack.

2. Discussion of the Prior Art

Portable, heavy duty jacks, typically used in the railway, mining and construction industries, include a motor, a pump, a working fluid reservoir and a hydraulic cylinder, all mounted on a wheeled carriage. Examples of portable lift jacks are disclosed in U.S. Pat. No. 2,575,230, issued Nov. 6, 1951 to J. D. Thress; U.S. Pat. No. Re 24,230, issued Oct. 23, 1956 to F. S. Pearne; and U.S. Pat. No. 4,251,055, issued Feb. 17, 1981 to David S. Leong et al. Often, circumstances dictate that the lift jack be left in a use position for an extended period of time. However, the jacks described in the above referenced patents are such that it is necessary to leave the entire apparatus in place or to replace the jack with a permanent brace. Thus, it may be necessary to stock a large number of expensive jacks or to supplement the jacks with separate brace units.

GENERAL DESCRIPTION OF THE INVENTION

An object of the invention is to provide a portable jack, which includes a power module for use with a plurality of similar lift modules, which can be moved to a use position and left in such position while the power module is moved to another use location.

Another object of the invention is to provide a relatively simple portable, module jack which includes a load supporting or base system carried by the jack.

Accordingly, the present invention relates to a portable, modular jack comprising:

(a) power module means including:
  (i) carriage means,
  (ii) motor means on said carriage means,
  (iii) pump means on said carriage means operated by said motor means, and
  (iv) working fluid reservoir means on said carriage means for supplying working fluid to said pump means;

(b) fluid actuated lift module means for receiving working fluid from said pump means for lifting a load; and (c) connector means for releasably interconnecting said power module means and said lift module means, whereby said lift module means can be carried by said power module means to a use position, actuated to lift a load, and separated from said power module means at the use position.

BRIEF DESCRIPTION OF THE DRAWINGS

The invention will be described in greater detail with reference to the accompanying drawings which illustrate a preferred embodiment the invention and wherein.

It will be noted that for the sake of simplicity parts have been omitted from various figures of the drawings.

DESCRIPTION OF THE PREFERRED EMBODIMENT

Figure 1:
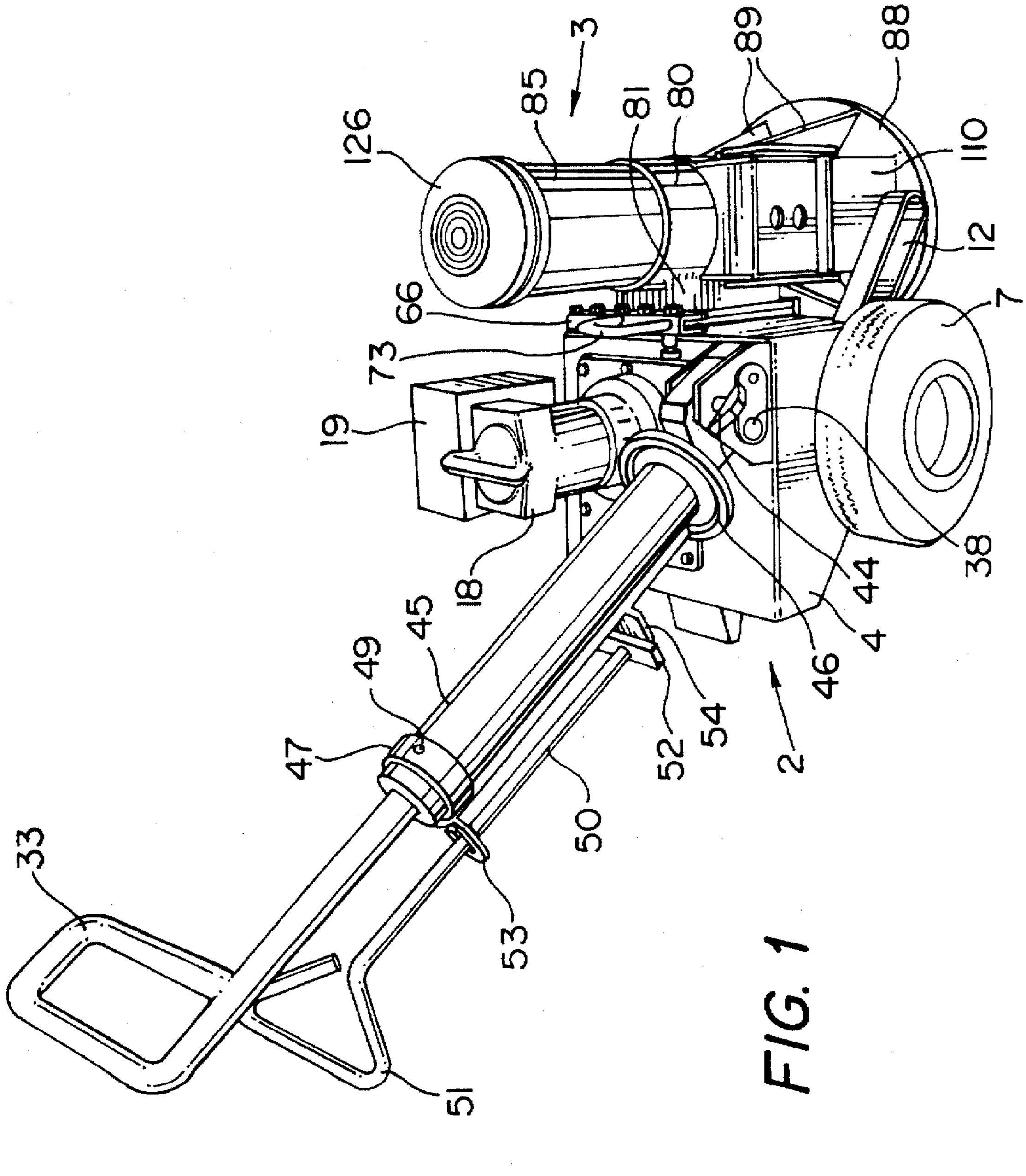
FIG. 1 is a perspective view of a modular, portable jack in accordance with the present invention.

Referring to FIG. 1, the modular jack of the present invention consists of a power module generally indicated at 2, and a lift module generally indicated at 3.

Figure 2:
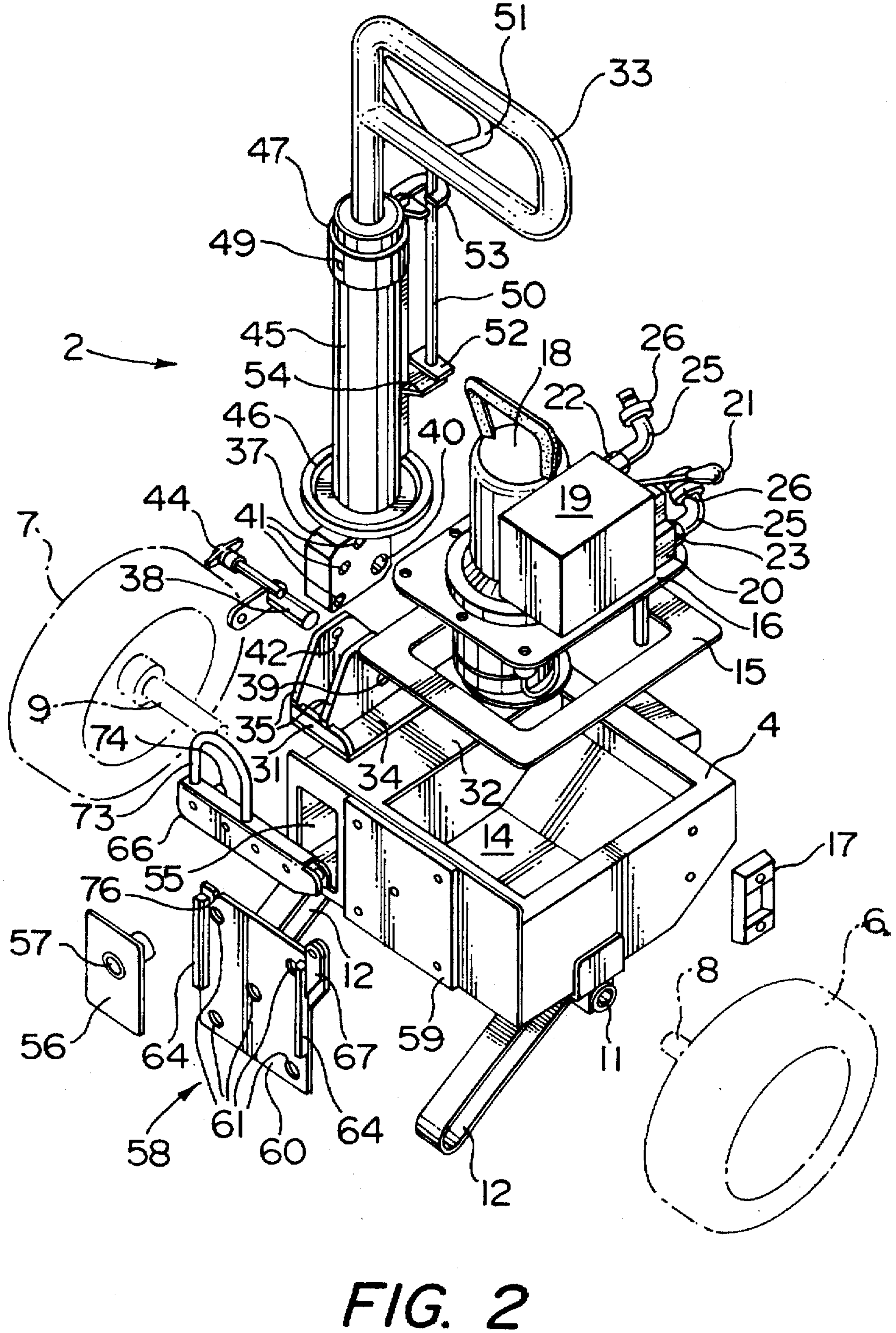
FIG. 2 is an exploded, isometric view of a power module used in the jack of FIG. 1.
Figure 3:
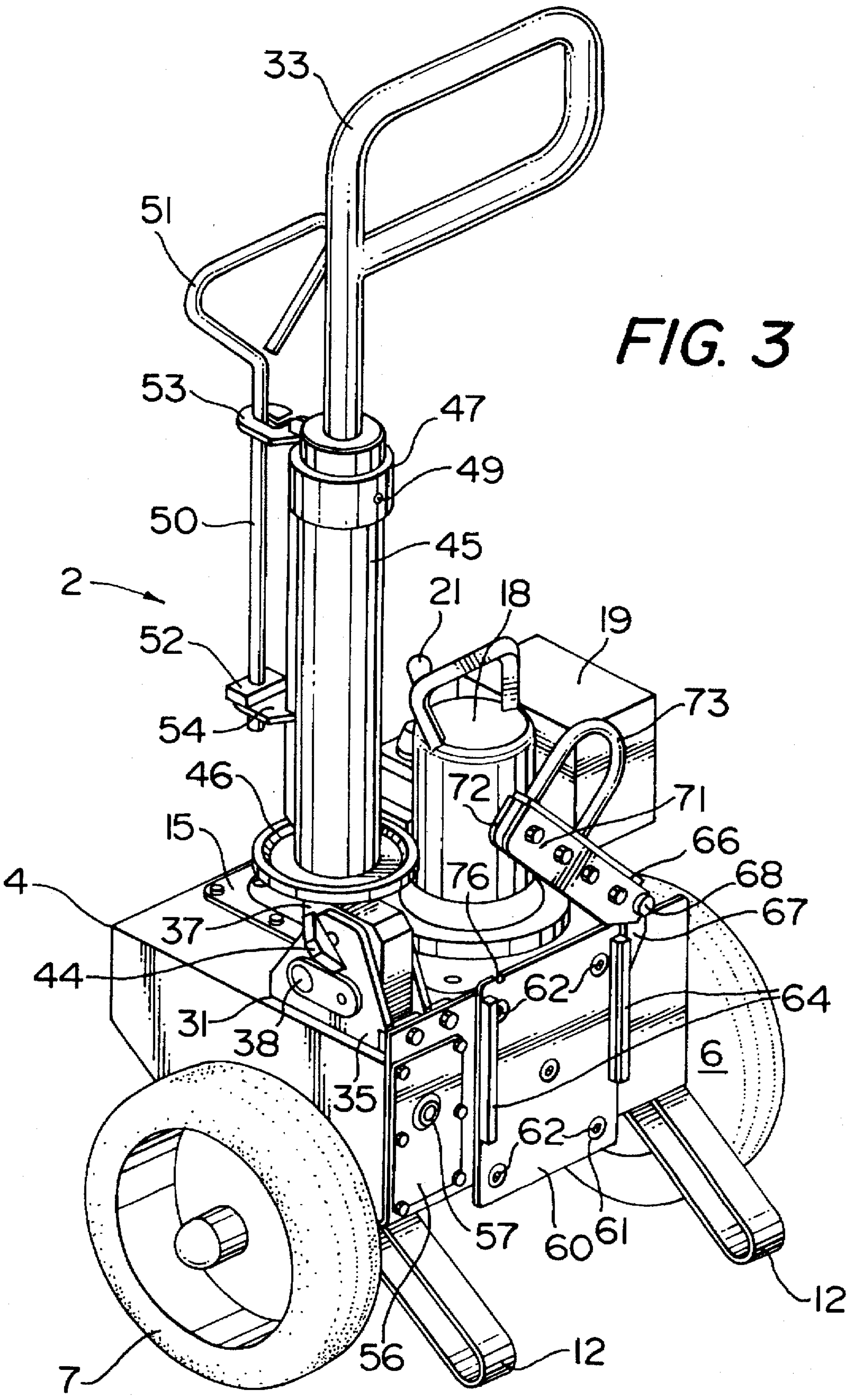
FIG. 3 is an isometric view of the assembled power module of FIG. 2.

With particular reference to FIGS. 2 and 3, the power module 2 includes a carriage defined by a body or housing 4 supported by wheels 6 and 7, which are rotatably mounted on axles 8 and 9, respectively. Brackets 11 (one shown) on the base of the body 4 receive the axles 8 and 9. Elongated U-shaped feet 12 extend downwardly and forwardly from the underside of the body 4 for supporting the power module 2 in an upright position when the lift module 3 is disengaged from the power module 2. The body 4 defines a hydraulic fluid reservoir 14, which is closed by a top plate 15 and a mounting plate 16. A gauge 17 (FIG. 2) mounted on one side of the body 4 provides a visual indication of the quantity of fluid in the reservoir 14. A pump 18 is mounted in the plate 16. The pump 18 is driven by an electric motor 19 for pressurizing the working fluid. The electric motor 19 can be replaced by any available power source, e.g. an air, manual or gasoline engine drive.

A valve 20 on the mounting plate 16 controls the flow of fluid into and out of the fluid reservoir 14. A lever 21 extends out of the valve 20 for manual selection of the direction of flow of the working fluid. Reservoir outlet and inlet nipples 22 and 23, respectively on the valve 20 are connected to hoses (not shown) by elbows 25 and male hose connectors 26 for carrying fluid from and to the reservoir 14.

A clevis 31 is mounted on the top wall 32 of the carriage body 4 for pivotally receiving a generally P-shaped handle 33. The clevis 31 includes a base 34 and two spaced apart vertical arms 35 on the base 34. The bottom end of the handle 33 is defined by a block 37, which is received between the two vertical arms 35 of the clevis 31. A pin 38 is inserted into aligned holes 39 and 40 in the arms 35 and the block 37, respectively to pivotally connect the handle 33 to the body 4. Three additional holes 41 are provided in the block 37 for adjusting the position of the handle 33. The holes 41 are spaced equidistant from the hole 40. By aligning one of the holes 41 with aligned holes 42 (one shown) in the arms 35 of the clevis 31, and inserting a locking pin 44 into the aligned holes, the handle 33 can be fixed in one of three different angular positions.

A sleeve 45 is mounted on the handle 33. The sleeve 45 includes a base 46 on the bottom end thereof and a slidable collar 47 on the top end thereof for supporting a number of generally C-shaped load holding rings (generally indicated at 48 in FIGS. 7, 8 and 10 and described hereinafter in greater detail). A set screw 49 (FIGS. 2, 3 and 10) locks the collar 47 in the desired position. A rod 50 is used to facilitate the removal of the load holding rings 48 from the sleeve 45. The rod 50 includes a triangular handle 51 at one end and a crossbar or plate 52 proximate the other end thereof. The rod 50 is stored on brackets 53 and 54 extending outwardly from the rear of the sleeve 45. Alternatively, each load holding ring 48 can include its own handle to facilitate manipulation.

If the motor 19 for operating the pump 18 is an air motor, the power module 2 includes a noise reducing muffler (not shown) in a chamber 55 (FIG. 1) in the body 4. The chamber 55 is closed by a cover plate 56, which carries a hose clamp 57 and an exhaust hose (not shown) for connecting the air motor 19 to a muffler (not shown) in the chamber 55. The muffler chamber 5 also provides secondary noise reduction.

A power module connector generally indicated at 58 is mounted on a plate 59 on the body 4. The connector 58 includes a first rectangular mounting plate 60 with five spaced apart countersunk holes 61 therein. Screws 62 (FIG. 3) extend through the holes 61 and secure the plate 60 to the plate 59 of the body 4. Vertical aligning bars 64 are provided on each side of the plate 60. A clamp arm 66 is pivotally connected to the plate 60 by means of a hinge bracket 67, which extends outwardly and upwardly from one side of the plate 60. The clamp arm 66 has an inverted U-shaped cross section (FIG. 5) and is pivotally connected to the bracket 67 by means of a bolt 68 and a nut (not shown). Bolts 69 and nuts 70 are used to draw the sides 71 and 72 of the arm 66 together for adjusting the opening width. A U-shaped handle 73 is provided on the arm 66 to facilitate manipulation thereof. A spring loaded plunger 74 is mounted in a threaded sleeve 75 on one side 72 of the arm 66 for movement into and out of the area between the sides 71 and 72. A notch 76 (FIGS. 2 to 4) is provided in the mounting plate 60 for receiving the plunger 74 when the arm 66 is in the closed position.

Figure 4:
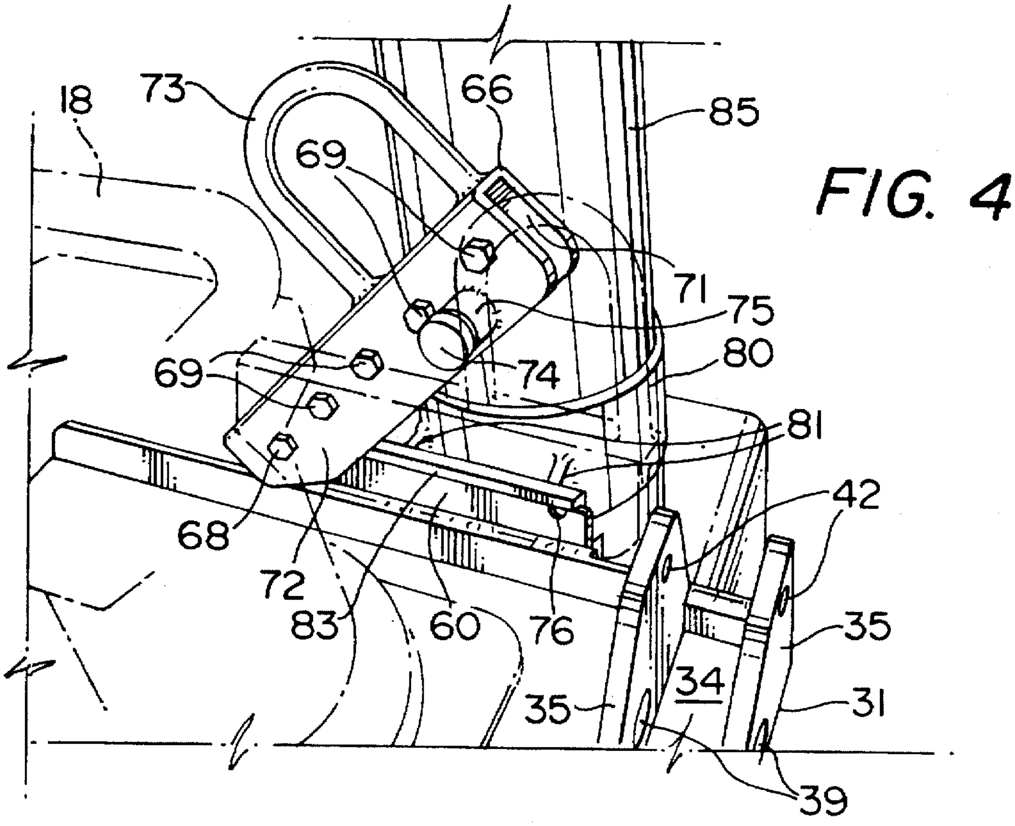
FIG. 4 is a perspective view of a clamping assembly used in the jack FIG. 1.
Figure 5:
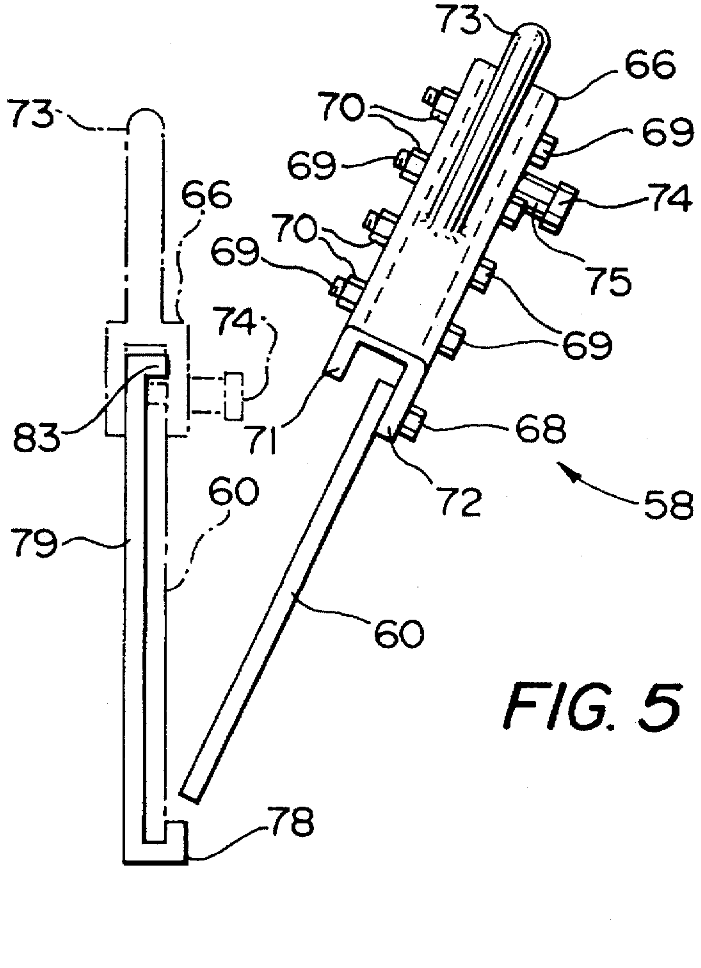
FIG. 5 is an end view of the clamping assembly of FIG. 4.

During coupling of the power and lifting modules 2 and 3, the power module 2 is tilted so that the first mounting plate 60 is inclined (FIG. 5). The inclined plate 60 is moved onto an L-shaped ledge or flange 78 on the bottom end of a second mounting plate 79 carried by a casing 80 on the lift module 3. Actually, as shown in FIGS. 1 and 4, the plate 79 is carried by a pair of arms 81 extending outwardly from the cylindrical casing 80 of the lifting module 3. With the clamp arm 66 in the fully open position, when the power module 2 is returned to the rest position (FIG. 3) the plate 60 comes to rest in a vertical position against the plate 79 (as shown in phantom outline on the left of FIG. 5) beneath a horizontal aligning bar 83. In this position, the plate 79 is located between the vertical aligning bars 64. The arm 66 is rotated to the closed position so that it straddles the top ends of the plates 60 and 79, and the spring loaded plunger 74 is released, passing beneath the bar 83 and through the notch 76 to a position against the plate 79. This combination of elements releasably locks two modules 2 and 3 together, the bars 64 preventing lateral movement, the ledge 78 and the bar 83 preventing vertical movement, and the clamp arm 66 preventing forward or backward movement.

Figure 6:
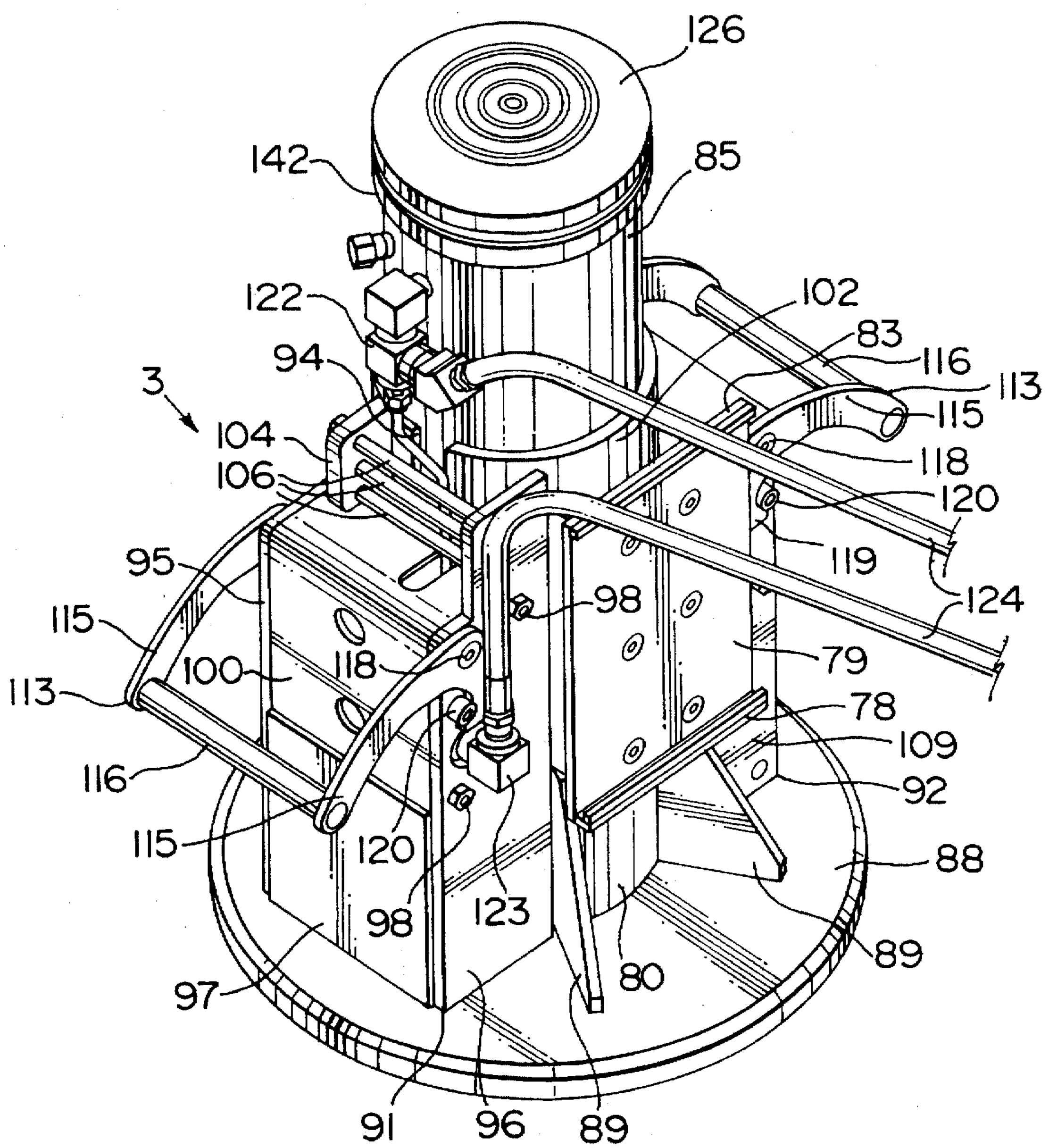
FIG. 6 is an isometric view of a lift module used in the jack of FIG. 1 in the retracted position.
Figure 7:
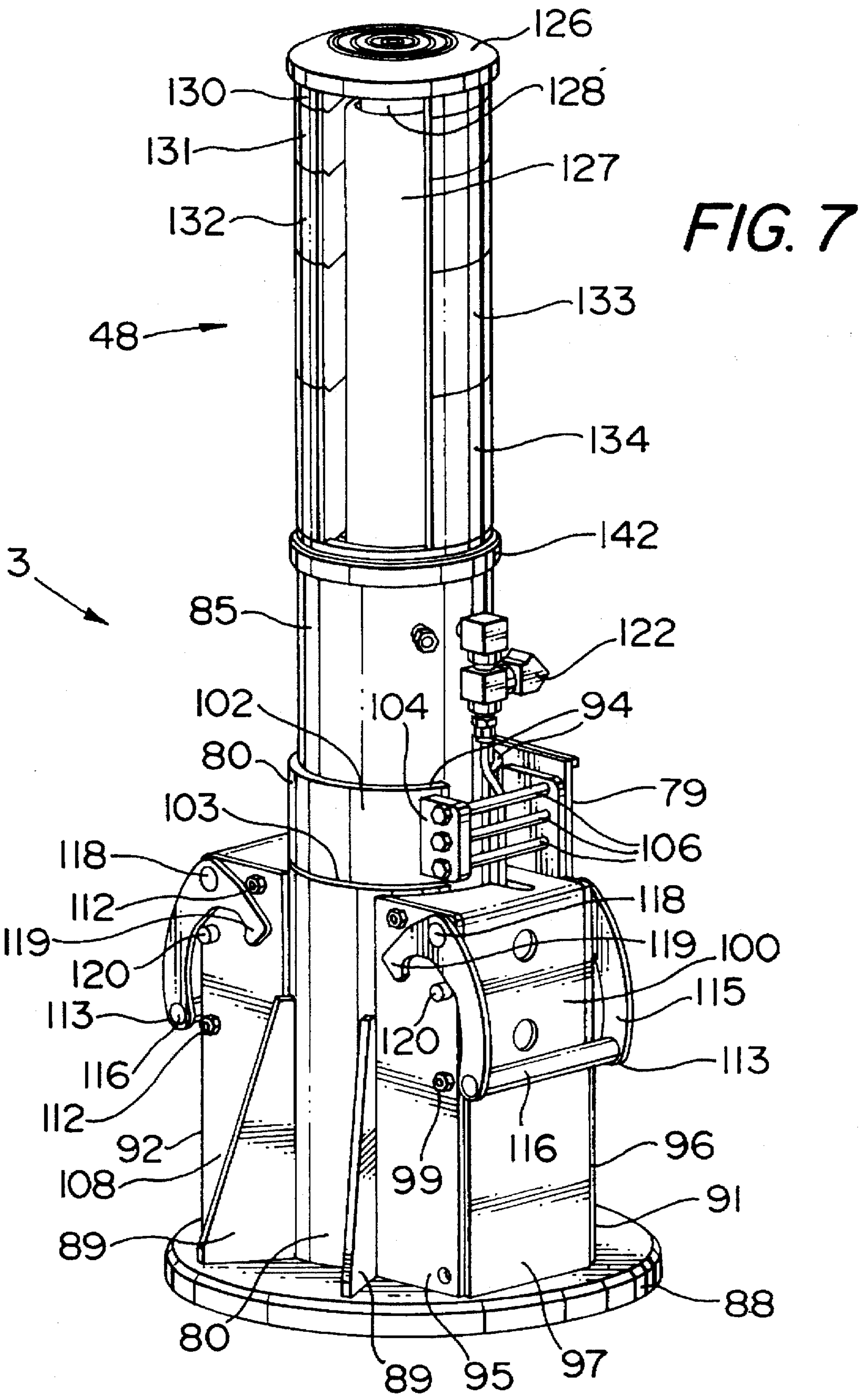
FIG. 7 is an isometric view of the lift module of FIG. 6 in the extended, load supporting position.

With reference to FIGS. 6 and 7, the lift module 3 includes a vertically extending hydraulic cylinder 85 mounted in the cylindrical casing 80. The casing 80 is mounted on a disc-shaped base 88 and supported thereon by generally triangular gussets 89. The base 88 also carries a pair of rectangular casings or boxes 91 and 92. The cylindrical casing 80 does not completely encircle the hydraulic cylinder 85, i.e. a gap exists between the ends 94 of the casing 80. The box 91 includes a front plate 95 extending outwardly from proximate one end 94 of the casing 80, a rear plate 96 extending outwardly from proximate the other end 94 of the casing 80 and an end plate 97. Nuts 98 are mounted on threaded lugs 99 welded to the interior of the plates 95 and 96 for supporting a cover 100 on the box 91. A clamp 102 is provided at the upper end of the cylindrical casing 80 for securing the hydraulic cylinder 85 therein. The clamp 102 is created by making a cut 103 in the casing 80 extending from one end 94 around approximately one half of the circumference of the casing. An ear 104 extends outwardly from the outer end of the clamp 102. Three bolts 106 extending from the ear 104 to the rear plate 96 of the box 91 and are used to tighten the clamp 102 around the hydraulic cylinder 85.

The other rectangular box 92 is similar to the box 91, including a front plate 108, a rear plate 109 and an end plate.110 (FIG. 1). Threaded lugs and nuts 112 are provided on the plates 108 and 109 for the sake of symmetry, i.e. so that the box 92 has the same appearance as the box 91. A handle 113 is provided on each of the boxes 91 and 92. Each handle 113 is defined by a pair of inverted L-shaped arms 115 interconnected by a rod 116 extending between the outer ends thereof. The inner ends of the arms 115 are pivotally connected to the box 91 or 92 by bolts 118, the inner free end of each arm 115 defines a hook 119 for engaging a pin 120 extending outwardly from the front and rear of the boxes 91 and 92. Thus, when the handles 113 rotate from the rest position (FIG. 7) to the lifting position (FIG. 6), the hooks 119 engage the pins 120 to maintain the handles in a fixed substantially horizontal position during lifting.

Connectors 122 and 123, and hoses 124 (FIG. 6) connect the cylinder 85 to the valve 20 (FIG. 2) which controls the flow of hydraulic fluid to and from the cylinder. A saddle 126 (FIG. 6 and 7) is provided on the top, outer free end of the piston 127 (FIG. 7) of the hydraulic cylinder 85. For such purpose, the saddle 126 includes a stem 128 (FIGS. 8 and 9),for mating with a cylindrical recess (not shown) in the piston 127. As best seen in FIG. 7, when the piston 127 is in the extended position, the load holding rings 48 are placed around the piston between the saddle 126 and the top end of the hydraulic cylinder 85. The rings 48 are intended to support a load and to maintain the piston 127 in an extended position. Individual rings 130–134 differ in size, i.e. thickness to accommodate virtually any length of piston extension.

Figure 8:
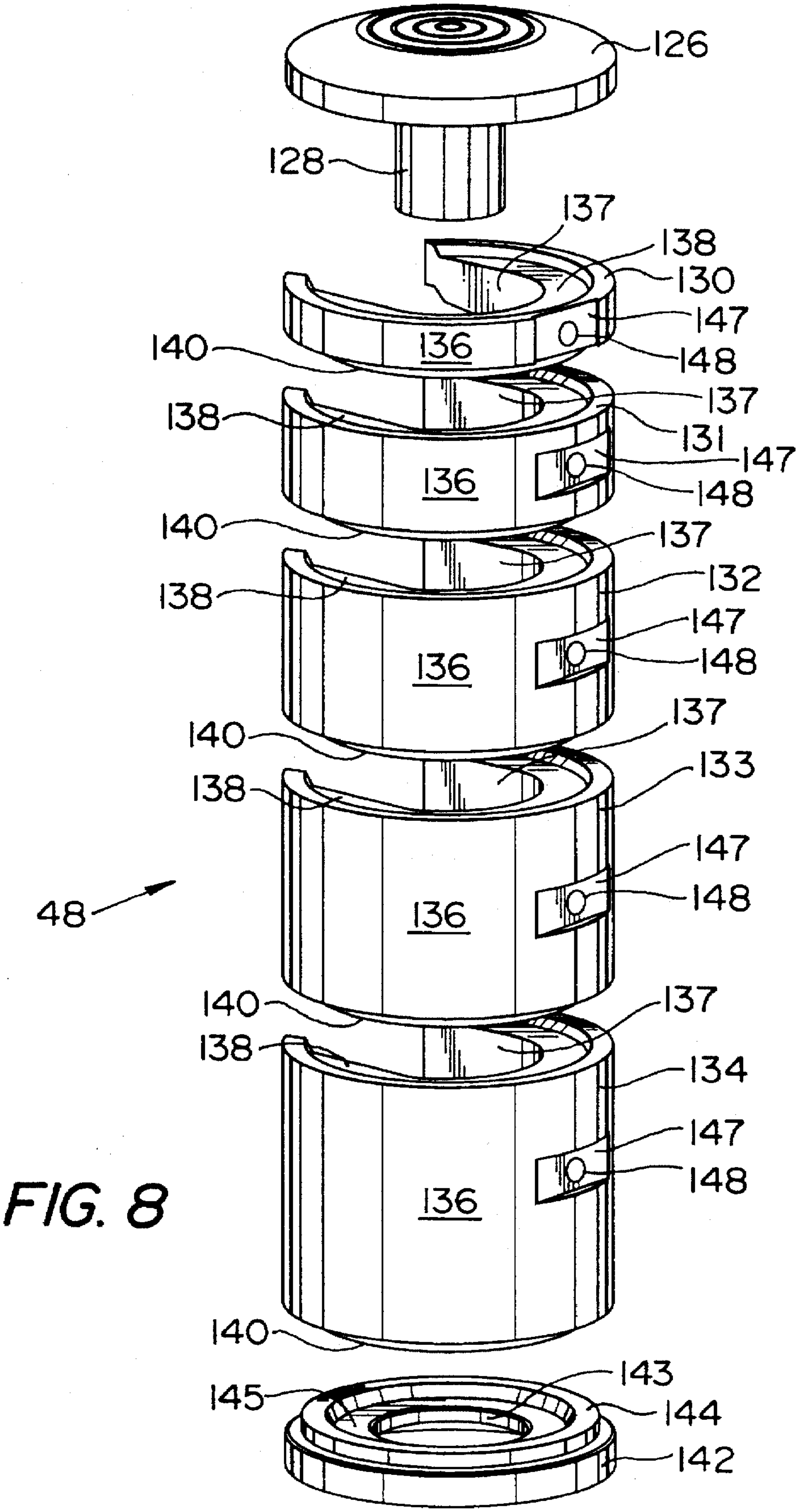
FIG. 8 is an exploded isometric view of load supporting rings, a base ring and a saddle used in the lift module of FIGS. 6 and 7.
Figures 9, 10:
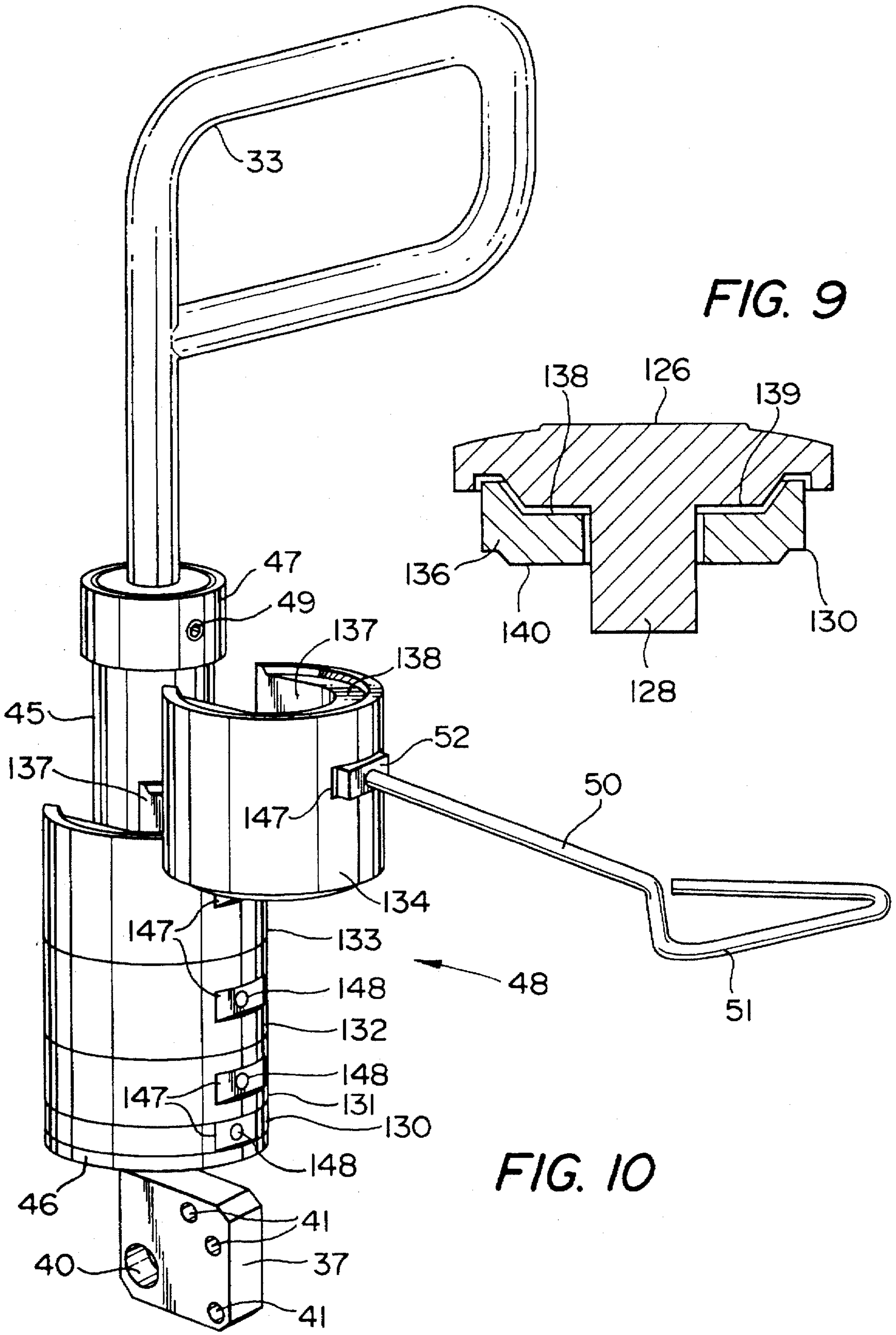
FIG. 9 is a cross-sectional view of a load supporting saddle an a load supporting ring of FIG. 8.
FIG. 10 is an isometric view of a handle and load supporting rings used in the power module of FIGS. 1 to 3.

Referring to FIGS. 8 to 10 of the rings 130–134 includes a body 136 defining a major portion of a cylinder with a slot 137 in one side thereof permitting mounting of the body 136 on the sleeve 45 or on the piston 127. Thus, the body 136 is generally C-shaped when viewed from above or below. A recess 138 is provided in the top surface of the body 136 for receiving a projection 139 on the bottom of the piston saddle 126, or a projection 140 on the bottom of each body 136 to facilitate stacking of the rings on each other and on either the base 46 of the sleeve 45 or on a recessed base ring 142 (FIG. 7) on the top end of the cylinder 85. As shown in FIG. 8, the ring 142 includes a central opening 143 for the piston rod 127, and an annular projection 144 on the top thereof defining a recess 145 for receiving the projection 140 on the bottom of a ring body 136.

A rectangular recess 147 is provided in the side of each ring body 136 for receiving the plate 52 on the rod 50. A small circular opening 148 in the center of the recess 147 receives the straight free end of the rod 50, so that the rings 48 can be moved between the handle 33 (FIG. 10) and the piston rod 127 (FIG. 7).

Referring again to FIGS. 4 and 5, with the two modules 2 and 3 separated, the first step in connecting the modules is to tilt the power module 2 using the handle 33 so that the plate 60 is inclined with respect to the vertical plate 79 on the lift module. The power module 2 is moved into position against the lift module 3, i.e. the lower edge of the plate 60 is manipulated into the channel in the ledge 78. The power module 2 is rotated to move the plate 60 against the plate 79, while ensuring that the aligning bars 64 are on either side of the plate 79. The clamp arm 66 is rotated from the fully open to the close position, in which the top ends of the plates 60 and 79 are sandwiched between the sides 71 and 72 of the arm 66. Finally, the plunger 74 is released to pass through the notch 76 beneath the horizontal aligning bar 83 to releasably latch the arm 66 in the closed position.

The power module 2, with the lift module 3 attached, is again tilted and moved to a use location, at which the saddle 126 is located beneath a load to be lifted. At the use location, the power module 2 and the lift module are returned to the vertical position. The motor 19 is started and the valve 20 is opened to cause hydraulic fluid to flow to the cylinder 85 which raises the piston 127 and elevates the load. Once the load has been raised to the desired height, rings 48 are removed from the sleeve 45 on the handle 33 of the power module 2 and placed on the ring 142 around the piston 127 (FIG. 7) of the lift module 3. The hoses 124 from the power module 2 are disconnected from the lift module 3, and above described procedure is reversed to release the lift module 3 from the power module 2. The power module 2 can then be connected to another lift module 3 and the procedure repeated, or used independently to power other hydraulic apparatus.

We claim:

1. A portable, modular jack comprising:

(a) power module means including:
  (i) carriage means,
  (ii) motor means on said carriage means,
  (iii) pump means on said carriage means operated by said motor means, and
  (iv) working fluid reservoir means on said carriage means for supplying working fluid to said pump means;

(b) fluid actuated lift module means for receiving working fluid from said pump means for lifting a load; and (c) connector means for releasably interconnecting said power module means and said lift module means, whereby said lift module means can be carried by said power module means to a use position, actuated to lift a load, and separated from said power module means at the use position.

2. A jack according to claim 1, including handle means on said power module means to facilitate manipulation thereof.

3. A jack according to claim 2, including pivot means connecting said handle means to said power module means permitting angular adjustment of said handle means.

4. A jack according to claim 1, wherein said connector means includes first mounting plate means on said power module means; second mounting plate means on said lift module means; aligning means on at least one said mounting plate means for proper positioning of the first and second mounting plate means and consequently the lift module means with respect to said power module means; and clamp means for releasably latching said first and second mounting plate means together.

5. A jack according to claim 4, wherein said aligning means includes first vertical bar means on the sides of said first mounting plate means for bordering the sides of said second mounting plate means when the power module means and the lift module means are connected; and second horizontal bar means on the top and bottom of said second mounting plate means for bordering the top and bottom of said first mounting plate means when the power module means and the lift module means are connected.

6. A jack according to claim 5, wherein said clamp means includes locking arm means pivotal on one said first and second mounting plate means between an open position permitting coupling of the mounting plate means, and a locking position in which the locking arm means prevents separation of said first and second mounting plate means.

7. A jack according to claim 2, wherein said lift module means includes fluid actuated cylinder means for receiving fluid from said pump means; piston means slidable on said cylinder means; and load supporting saddle means on a top free end of said piston means.

8. A jack according to claim 7, including ring means for mounting in a storage position on said handle means of said power module means and in a use position on said piston means for supporting said saddle means when said piston means is in an extended, load supporting position and the cylinder means is disengaged from said pump means.

9. A jack according to claim 8, wherein said ring means includes a plurality of rings of various sizes for accommodating different load supporting positions of said piston means.

10. A jack according to claim 9, including projection means on end of each said ring, and recess means on the other end of each said ring, whereby the rings are stable when stacked on each other.

11. A jack according to claim 9, wherein said ring means includes slot means in one side thereof whereby said ring means can be mounted on said handle means of said power module means and on said piston means beneath said saddle means.

12. A jack according to claim 2, wherein said power module means includes body means defining said reservoir means and carrying said handle means; wheel means supporting said body means for movement; and feet means for supporting said body means in a rest position.

13. A jack according to claim 9, wherein said handle means includes sleeve means for receiving said plurality of rings for storage and transportation to a use location.

* * * * *